United States Patent [19]

Exell et al.

[11] Patent Number: 5,539,276

[45] Date of Patent: Jul. 23, 1996

[54] FLUORESCENT LAMP FOR USE IN AQUARIA

[75] Inventors: Adrian J. Exell, West Sussex; Milroy G. Abeywickrama; Martin P. A. Baines, both of Hertfordshire, all of England

[73] Assignees: General Electric Company, Schenectady, N.Y.; Interpet Limited, West Sussex, England

[21] Appl. No.: 242,587

[22] Filed: May 13, 1994

[30] Foreign Application Priority Data

May 17, 1993 [GB] United Kingdom ............... 9310100

[51] Int. Cl.$^6$ .............................. H01J 1/62; H01J 61/48
[52] U.S. Cl. ............................ 313/486; 313/487; 362/84
[58] Field of Search ........................ 362/101, 84, 806; 313/486, 487, 577, 572; 252/301.4 H, 301.4 P, 301.5

[56] References Cited

U.S. PATENT DOCUMENTS

| | | | |
|---|---|---|---|
| 3,676,728 | 7/1972 | Schreurs | 313/111 X |
| 5,028,839 | 7/1991 | Abeywickrama et al. | 313/486 X |
| 5,170,095 | 12/1992 | Bardos et al. | 252/301.4 P X |
| 5,402,036 | 3/1995 | Ito | 313/486 X |

Primary Examiner—Sandra L. O'Shea
Assistant Examiner—Ashok Patel
Attorney, Agent, or Firm—George E. Hawranko; Stanley C. Corwin

[57] ABSTRACT

A fluorescent lamp produces light having color coordinates within an ellipse (A) about 22 standard deviation of color matching around the color coordinates (b)x=0.344 y=0.302. The luminescent layer of the lamp includes a mixture of: magnesium fluorogermanate activated by manganese as red emitter; calcium halophosphate as white emitter; and a blue emitter preferably strontium pyrophosphate activated by divalent tin. The layer may alternatively be a mixture of red emitting magnesium fluorogermanate and blue emitting barium titanium pyrophosphate. Other blue emitters are also described.

6 Claims, 11 Drawing Sheets

FLUORESCENT LAMP FOR USE IN AQUARIA

FIELD OF THE INVENTION

The present invention relates to a fluorescent lamp, and in particular, to a fluorescent lamp for use in aquaria.

BACKGROUND OF THE INVENTION

Aquaria, particularly the relatively small type for household use, are commonly lit with fluorescent lamps. Former types of fluorescent lamp which have been used, while imparting a not unattractive reddish color to orangy objects such as goldfish, suffers from the disadvantage that, a reddish cast is imparted to almost all colors so that the many varieties of fish now popular for small aquaria do not show up to best advantage. Also there is distortion of green. Furthermore, such types of lamp have the disadvantage of low lumen output, poor lumen maintenance and large color drift with age affecting color rendering.

EP-A-0364124 discloses a fluorescent lamp for use in aquaria, the luminescent layer in said lamp comprising a mixture of red, green and blue phosphors, the red phosphor emitting predominantly in the spectral region of from 610 nm to 620 nm, the green phosphor emitting predominantly in the spectral region of from 540 nm to 545 nm and the blue phosphor having a peak emission wavelength between 430 nm and 480 nm with the half peak width not exceeding 80 nm, said red, green and blue phosphors being blended to form said mixture in such proportions that the color coordinates of the lamp employing said mixture on the CIE chromaticity diagram differ from the point x equals 0.300 and y equals 0.232 in any direction by no more than 10 standard deviations of color matching (SDCM). Most preferably, the lamp of EP-A-0364124 has the color coordinates x equals 0.300 and y equals 0.232.

Individual red, green and blue phosphors which may be used to form the above mixture are well known in the art and according to EP-A124 suitable such phosphors include the following:

Red Phosphor

Yttrium and/or gadolinium oxides activated by trivalent europium and having the following formula:

$(Y_aGd_{1-a})_2O_3:Eu^{3+}$

In the preferred case a is 1, i.e., the phosphor is:

$Y_2O_3:Eu^{3+}$

Green Phosphor

Cerium and terbium activated aluminates, silicates, phosphates and borates selected from compounds of the following formulae:

$CeMgAl_{11}O_{19}:Tb$ $Y_2SiO_5:Ce,Tb$ $LaPO_4:Ce,Tb$ $LaMgB_5O_{10}:Ce,Tb$

Particularly suitable are:

$CeMgAl_{11}O_{19}:Tb$ and $LaPO_4:Ce,Tb$

Blue Phosphor

Alkaline earth hexagonal aluminates of the B-alumina structure, or alkaline earth chlorophosphates, each activated by divalent europium and having the following formulae:

$BaMgAl_{10}O_{17}:Eu^{2+}$ $BaMg_{1.7}Al_{20}O_{32.7}:Eu^{2+}$ $BaMg_2Al_{24}O_{39}:Eu^{2+}$ $(Sr,Ca,Ba)_{10}Cl_2(PO_4)_6:Eu^{2+}$

Such a lamp avoids the problems of the former types of fluorescent lamp but uses entirely a mixture of expensive rare-earth phosphors.

SUMMARY OF THE INVENTION

The present invention seeks to allow the production of a fluorescent lamp for use in aquaria which avoids or at least reduces the disadvantages relating to the reddish casting as described with reference to said former types of lamp while allowing a lamp designer to avoid resorting to expensive rare-earth phosphors.

According to the present invention, there is provided a fluorescent lamp for use in aquaria, the luminescent layer in said lamp comprising a mixture of:

a red emitting phosphor emitting predominantly at about 660 nm; and a blue emitting phosphor emitting predominantly in the range 420 to 495 nm with a half peak width in the range 100 to 170 mm; and optionally a white emitting phosphor; the phosphors being blended to form said mixture in such proportions that the color coordinates of the lamp on the CIE chromaticity diagram differs from the point x=0.344 y=0.302 in any direction by no more than 22 standard deviations of color matching (SDCM).

The red emitting phosphor may be $Mg_{28}Ge_{7.5}O_{38}F_{10}$ activated by manganese and the white emitting phosphor may be $Ca_5[F,Cl](PO_4)_3$ activated by antimony (Sb) and manganese (Mn). Various compounds may be used as the blue emitter.

When the mixture is a binary mixture comprising the red emitting phosphor and the blue emitting phosphor, the blue emitting phosphor emits predominantly in the range 480 to 495 nm with a half peak width in the range 128 to 170 nm. The blue emitting phosphor may be barium titanium pyrophosphate or strontium fluorophosphate activated with antimony (Sb).

When the mixture comprises the red emitting phosphor, the white emitting phosphor and the blue emitting phosphor, the blue emitting phosphor emits predominantly in the range 425 to 480 nm with a half peak width in the range 100 to 140 nm, preferably 105 to 136 nm.

The blue emitting phosphor may be:

Strontium pyrophosphate activated by tin having the formula $Sr_2P_2O_7:Sn$; or

Calcium fluorophosphate activated by antimony having the formula $Ca_5F(PO_4)_3$:Sb; or Calcium magnesium tungstate having the formula $Ca_{(1-x)}Mg_xWO_4$ where $0 \leq x \leq 1$

BRIEF DESCRIPTION OF THE DRAWINGS

For a better understanding of the present invention reference will now be made, by way of example, to the accompanying drawings in which.

DETAILED DESCRIPTION OF THE INVENTION

Figure 1:
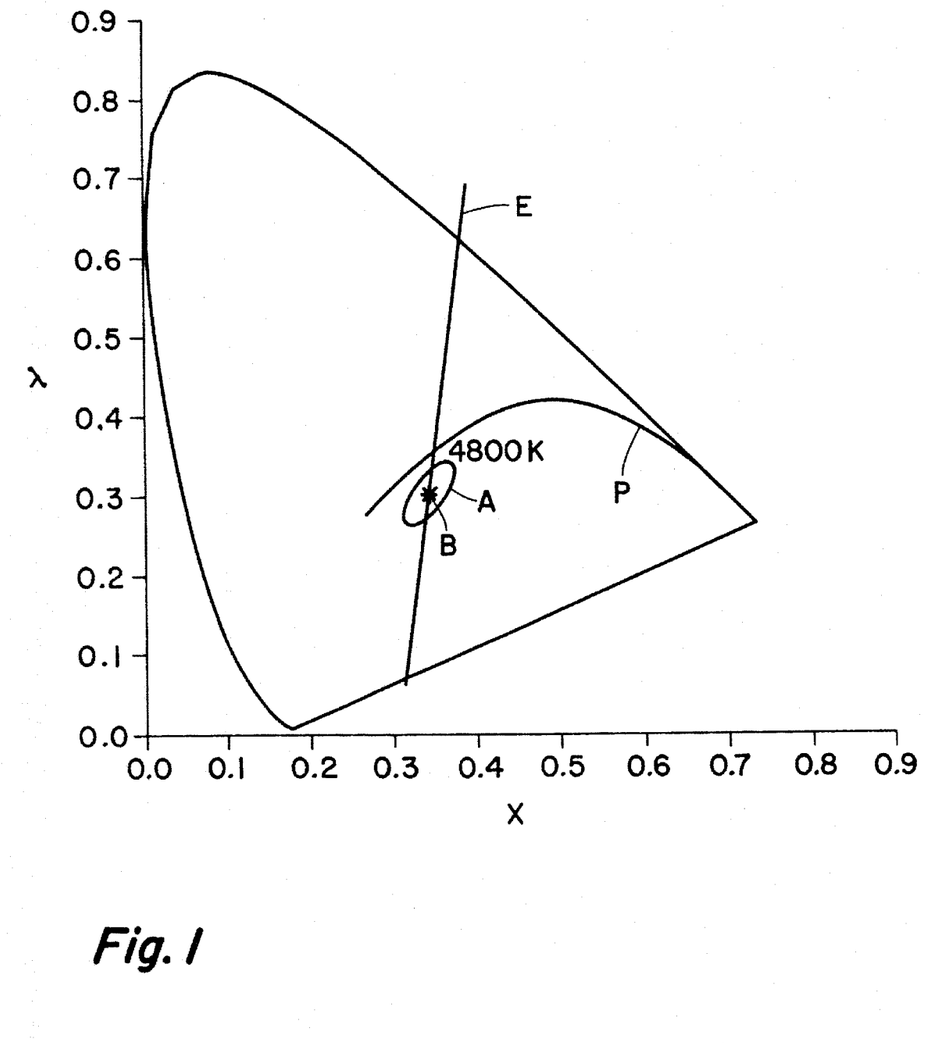
FIG. 1 is the CIE chromaticity diagram showing the color coordinates of a preferred mixture of phosphors surrounded by an ellipse describing the range of variation of the color coordinates in accordance with the invention.

Referring to FIG. 1 illustrative fluorescent lamps in accordance with the invention provide a source of light having the color coordinates falling on and within the ellipse A. A preferred lamp provides light having a the color coordinates B which are x=0.344 y= 0.302

Figure 2:
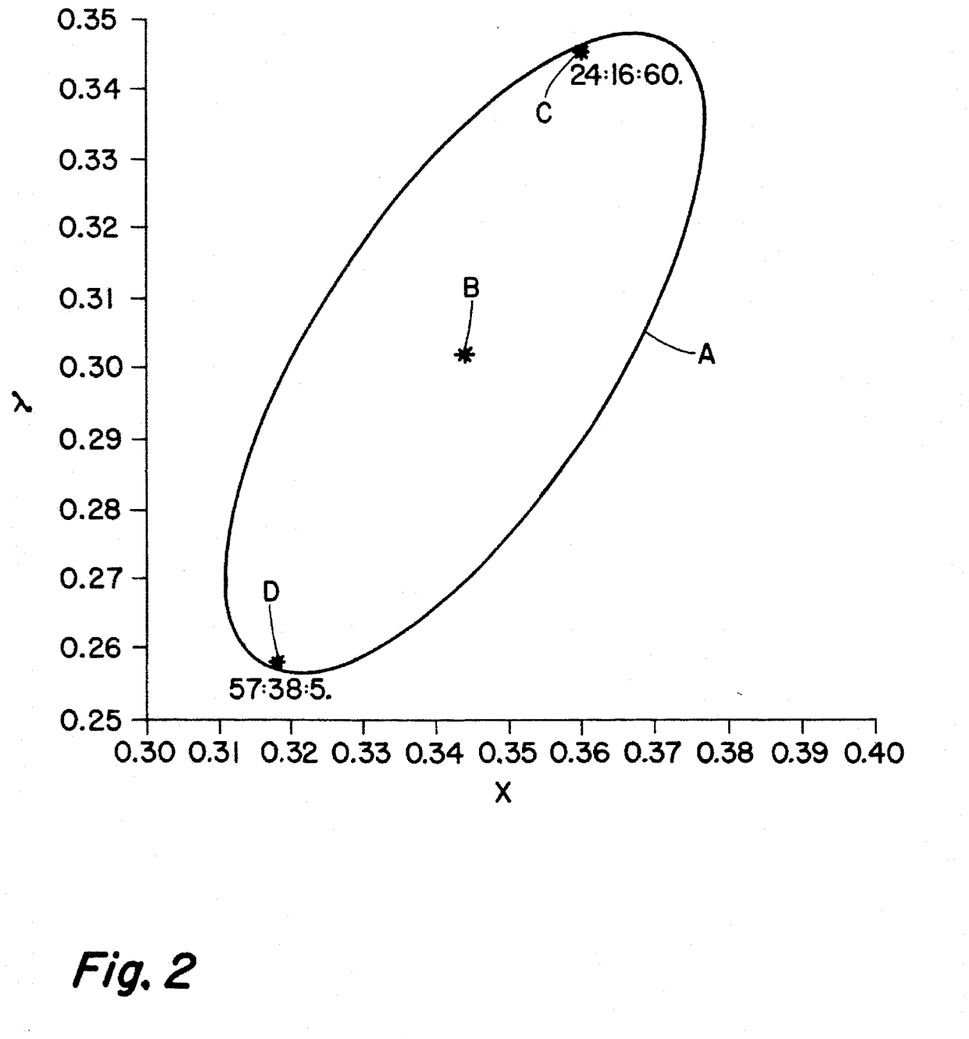
FIG. 2 shows the ellipse of FIG. 1 on an enlarged scale.
Figure 3:
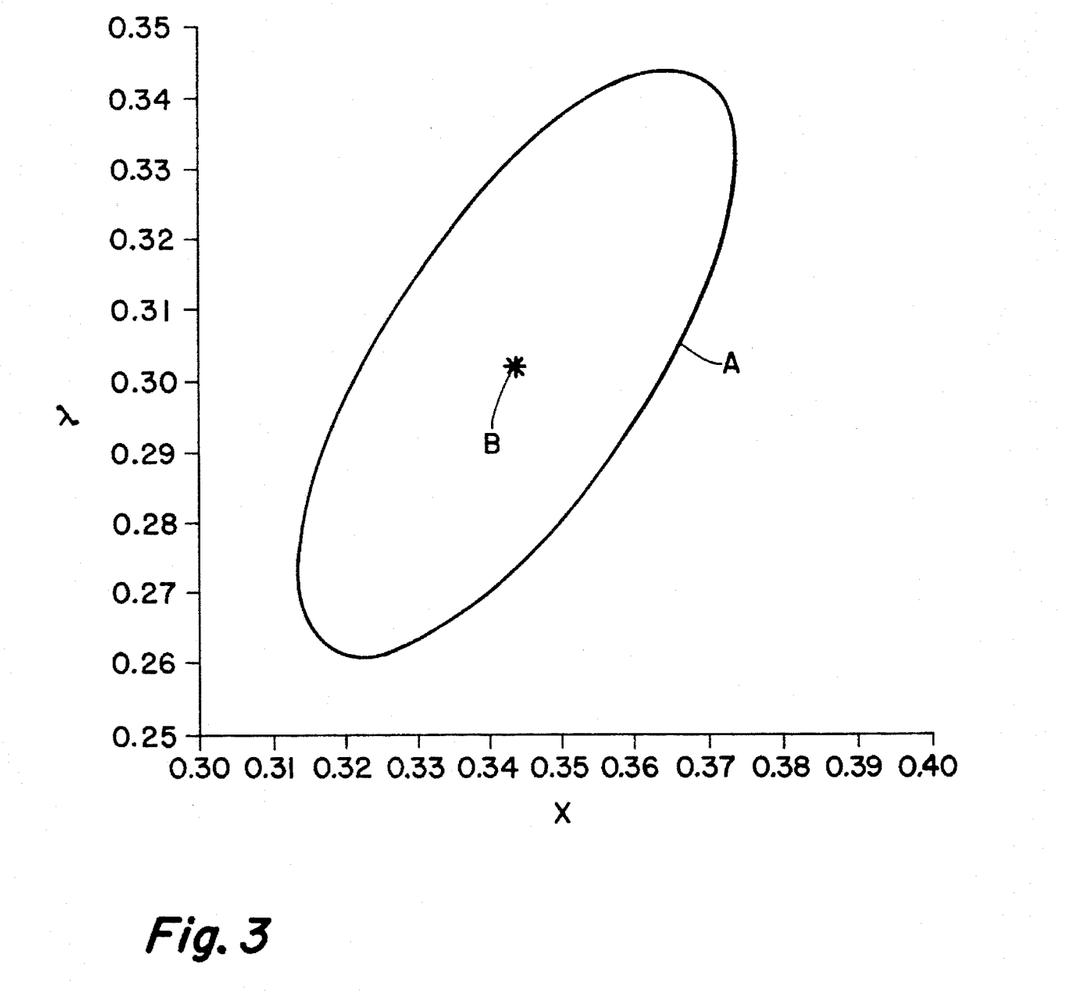
FIG. 3 shows a preferred ellipse.

The ellipse A defines the boundary of all coordinates within about 22 SDCM of coordinates B and is shown enlarged in FIG. 2. As known to those skilled in the art one SDCM (standard deviation of color matching) is the least variation in color noticeable to the human eye. Preferably the ellipse defines the boundary of all coordinates within about 20 SDCM of coordinates B as shown in FIG. 3.

Line P in FIG. 1 is the locus of color coordinates of black body radiation. Line E is the locus of color coordinates having the same Correlated Color Temperature as a black body radiator of 4800K. Thus point B has Correlated Color Temperature equivalent to a black body of temperature 4800K.

Illustrative lamps in accordance with the invention as described in the following EXAMPLES comprise a mixture of two or three phosphors which form the luminescent layer of the lamp. It is necessary to blend the selected phosphors in such proportions that the lamp has the desired color coordinates shown in FIG. 1, 2 or 3. The procedure for producing the correct blend is well known to those skilled in the art who readily appreciate that since there are many factors other than weight proportions which affect the contribution of each phosphor in a mixture to the light output and color of a lamp employing a phosphor layer comprising such a mixture it is not meaningful to lay down a particular weight proportion for each component of the mixture which will result, in all cases, in a lamp having the desired color coordinates.

These other factors, which cause the required weight properties to vary, include (among other possible ones) particle size profiles of the component phosphors, relative efficacies of the component phosphors, relative bulk densities of the component phosphors, size and loading of lamp using the phosphor mixture.

The phosphors disclosed in the following EXAMPLES are available from GE Lighting Limited, Lincoln Road, Enfield, Middlesex, England.

EXAMPLE 1—THE PREFERRED EXAMPLE

A fluorescent lamp for use in an aquarium has a mixture of the following phosphors which forms the luminescent layer of the lamp.

Red Phosphor

Deep red emitting magnesium fluorogermanate—activated by manganese.

$Mg_{28}Ge_{7.5}O_{38}F_{10}$:Mn

Figure 4A:
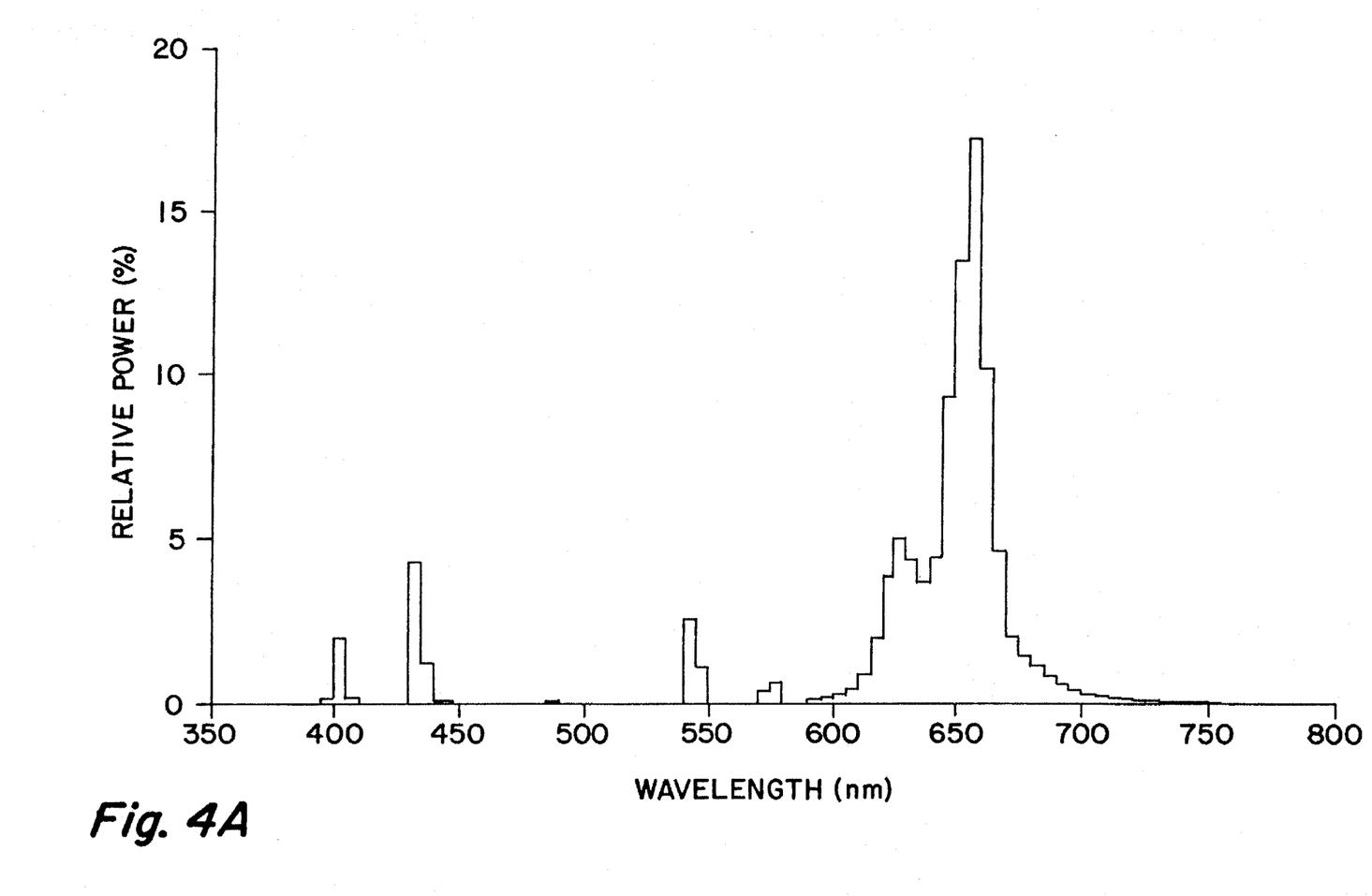
FIGS. 4A, 4B and 4C are spectra of the respective preferred phosphors useful in the present invention.

This material, when incorporated in a fluorescent lamp, has a spectrum as shown in FIG. 4A with peak red emission at a wavelength of about 660 nm.

Blue Phosphor

Blue emitting, strontium pyrophosphate—activated by divalent tin.

$Sr_2P_2O_7$:Sn

Figure 4B:
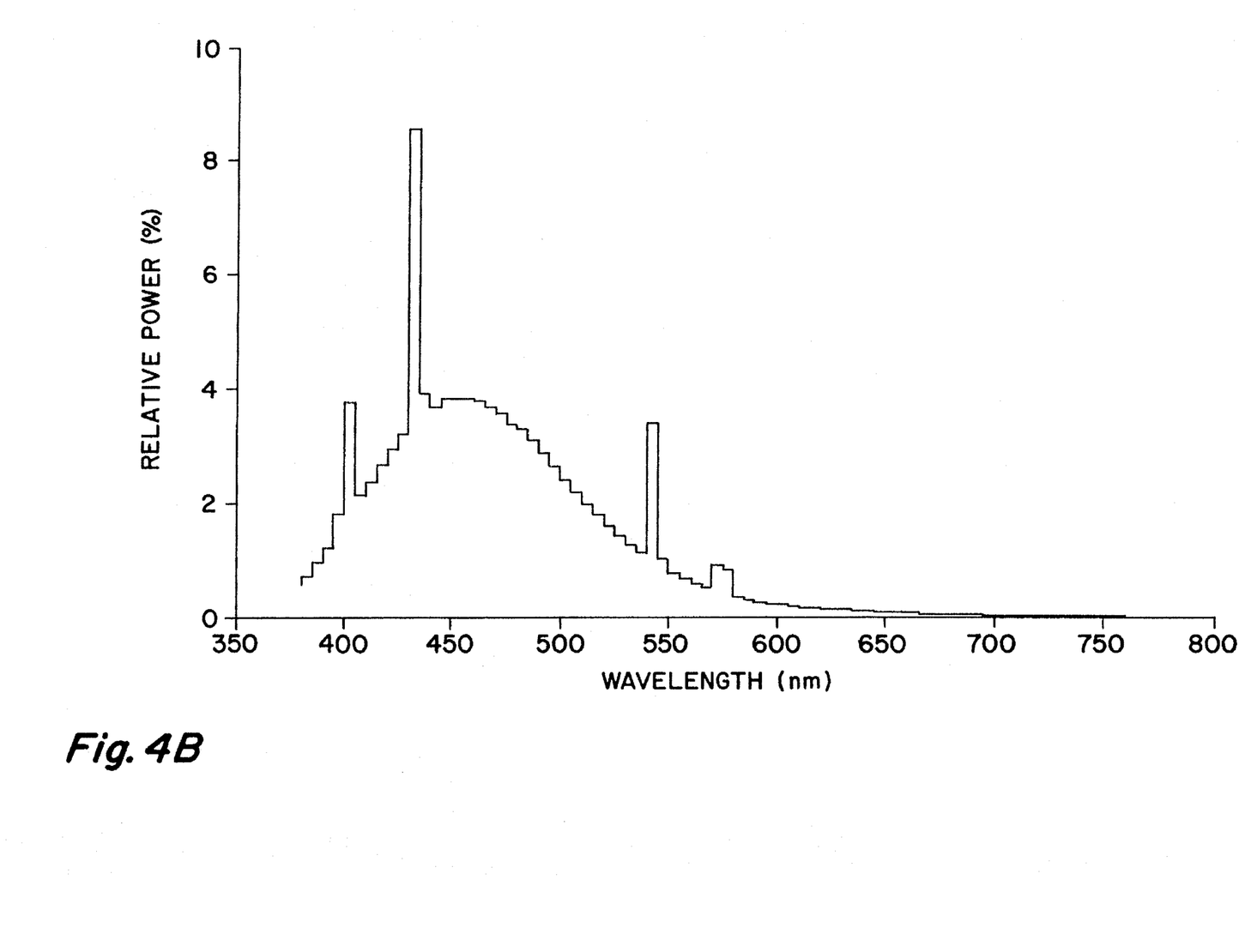

This material, when incorporated in a fluorescent lamp, has a spectrum as shown in FIG. 4B with peak blue emission at a wavelength of about 460 nm, where the ½ peak width is about 105 nm.

"White" Phosphor

Calcium halophosphate activated by both antimony (Sb) and manganese (Mn), having the formula:

$Ca_5[F,Cl](PO_4)_3$:Sb,Mn

Figure 4C:
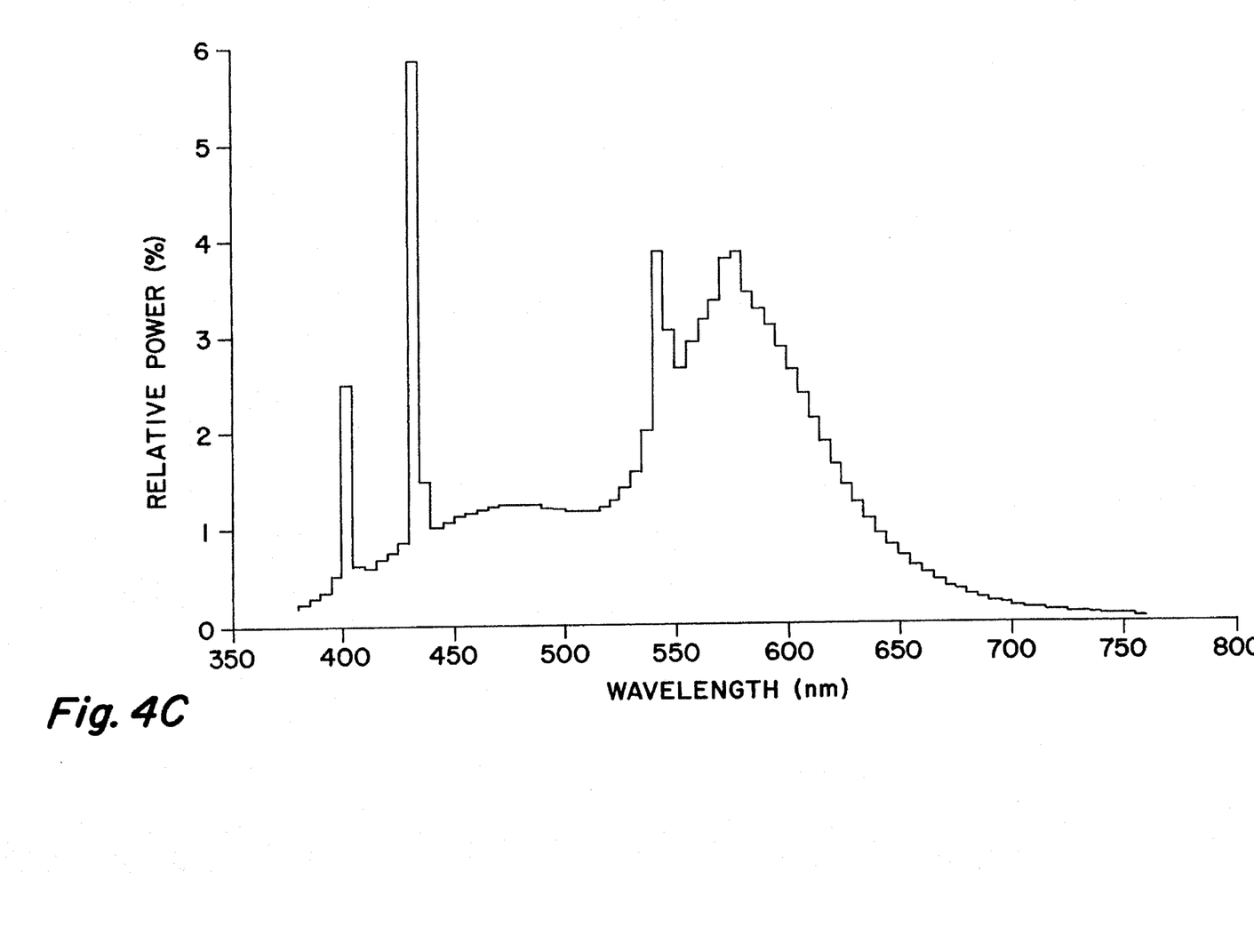

This material emits white light with a color temperature in the range 3000K to 5500K. It has a spectrum for 4000K as shown in FIG. 4C, when incorporated in a fluorescent lamp.

Preferred Mixture

The three phosphors are preferably mixed in the ratio by weight

| blue:Red:white |
|---|
| 45:30:25 |

Figure 4D:
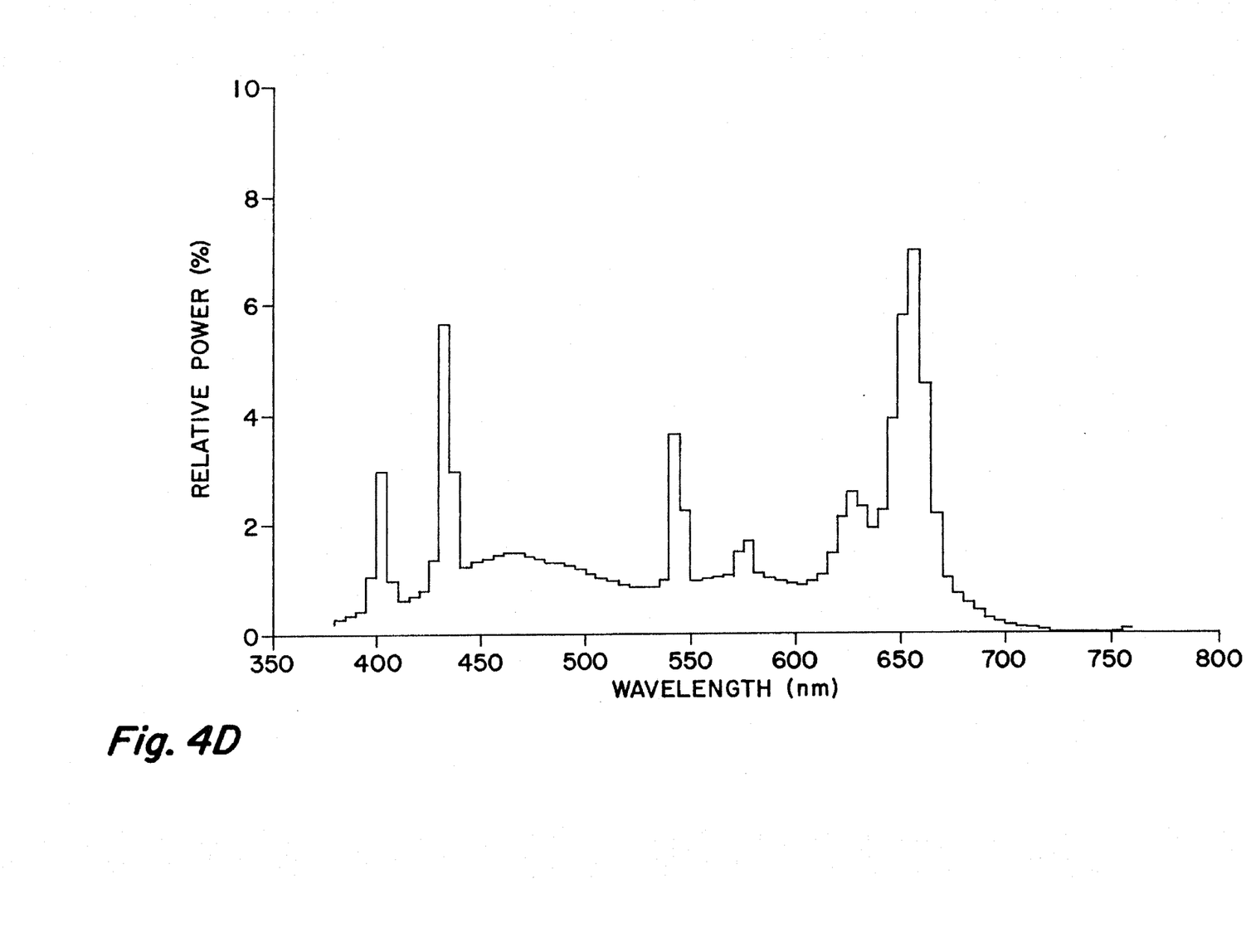
FIG. 4D is the spectrum of the preferred mixture of the preferred phosphors useful in the present invention.

The preferred mixture when incorporated in a fluorescent lamp has the spectrum shown in FIG. 4D. The red emission of the red phosphor is apparent around 660 nm and the blue emission of the blue phosphor is apparent around 460 nm. The white phosphor while adding to the red and blue emission also has the effect of adding green emission thereby improving color rendition and brightness compared to e.g., a lamp comprising only the red and blue phosphors.

The resulting lamp has the color coordinates B of

X=0.344 y= 0.302 and provides good color rendition in aquaria without resorting to the expensive rare earth phosphors of EP-A-364121.

EXAMPLE 2

The phosphors of Example 1 may be blended in the ratio

Figure 5:
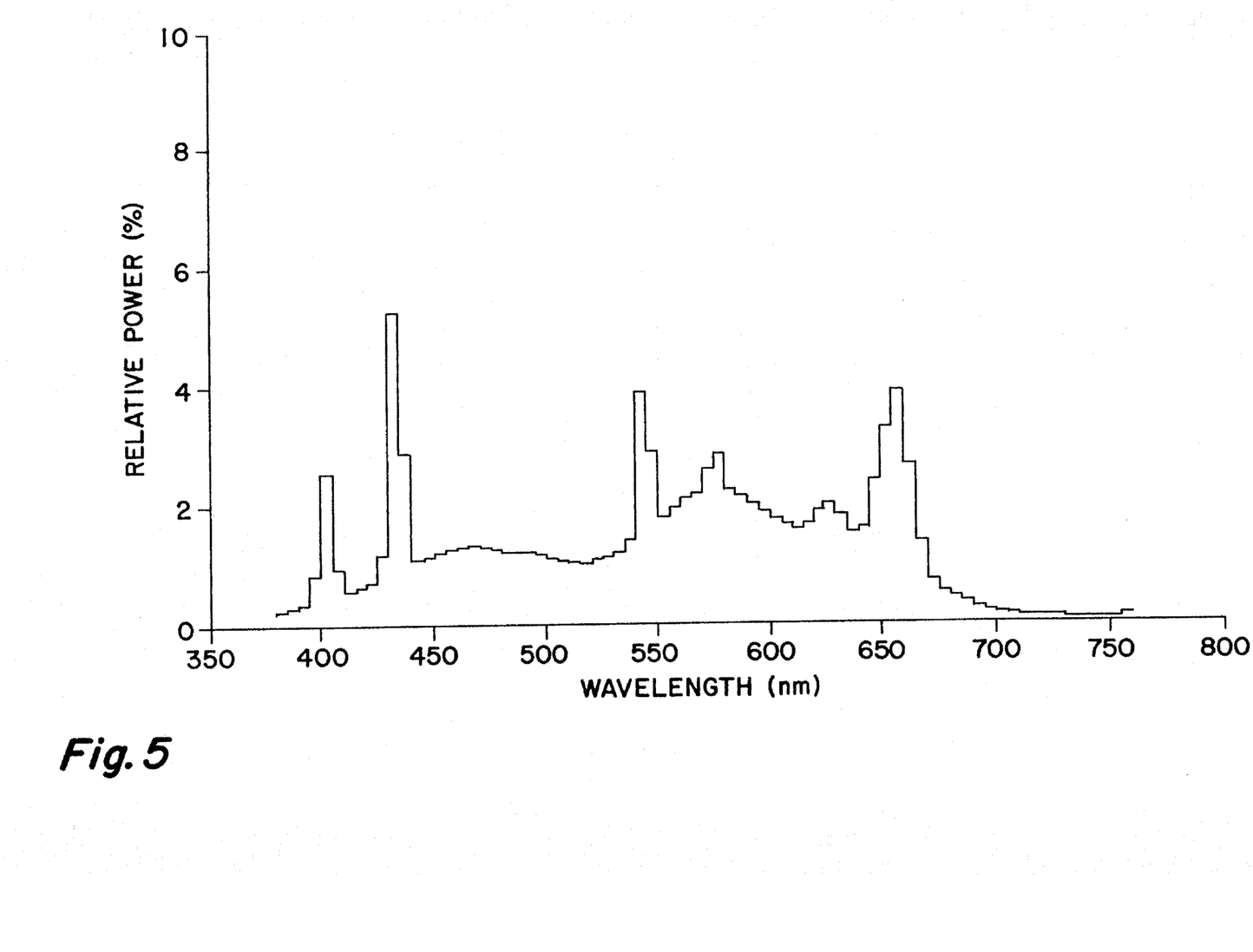
FIGS. 5 and 6 are spectra of alternative mixtures of the preferred phosphors useful in the present invention.

| blue:red:white |
|---|
| 24:16:60 | and, when incorporated in a fluorescent lamp as the luminescent layer, produce a spectrum as shown in FIG. 5. The lamp produces light having the color coordinates Cx= 0.360 y= 0.345 shown in FIG. 2 at the edge of the ellipse A.

EXAMPLE 3

The phosphors of Example 1 may be blended in the ratio

Figure 6:
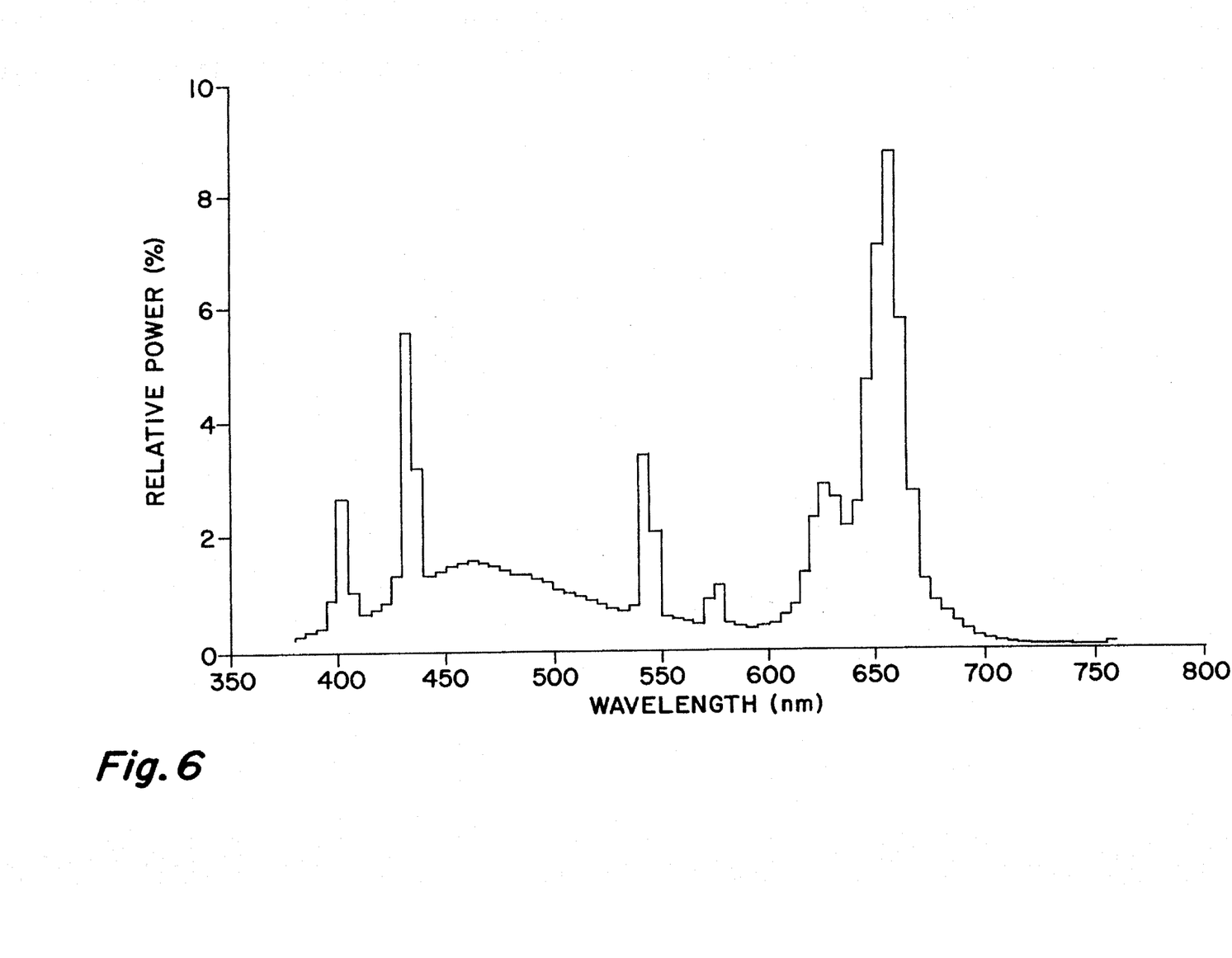

| blue:red:white |
|---|
| 57:38:5 | and, when incorporated in a fluorescent lamp as the luminescent layer, produces a spectrum as shown in FIG. 6. The lamp produces light having the color coordinate D x= 0.318 y= 0.258 at the edge of ellipse A.

ALTERNATIVE EXAMPLES—A1,A2 Binary Mixture of Phosphors A1) The red phosphor of Example 1 may be blended with Barium titanium pyrophosphate Ba$_2$TiP$_2$O$_9$ as a binary mixture.

Figure 7:
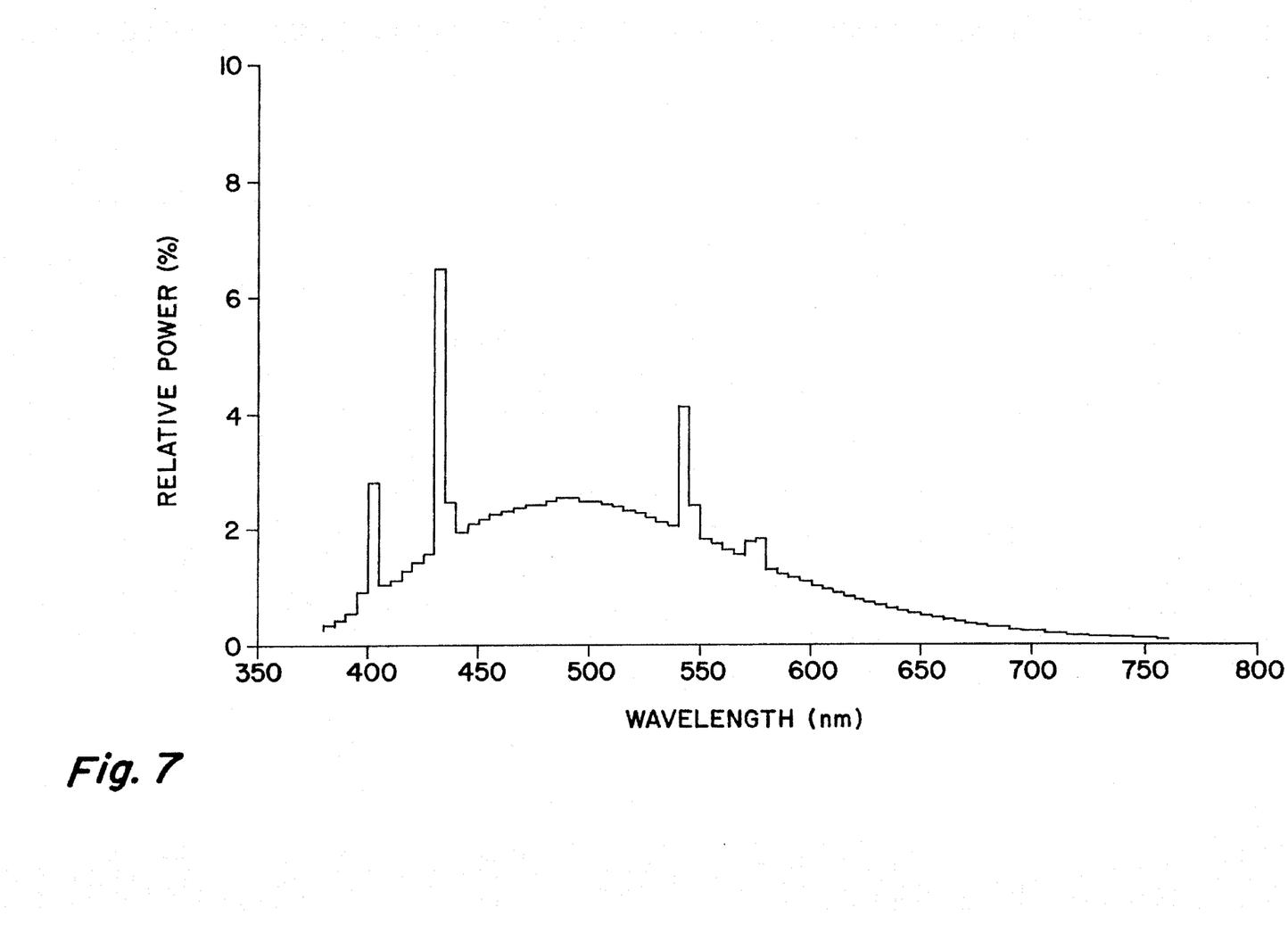
FIG. 7 is the spectrum of an alternative phosphor useful in yet another alternative mixture of phosphors useful in the present invention.

Barium titanium pyrophosphate when incorporated in a fluorescent lamp has a spectrum as shown in FIG. 7 having a peak emission of about 494 nm with a half peak width of about 170 nm.

The red and blue components are blended in proportions readily ascertainable by those skilled in the art to emit with color coordinates on or within the ellipse A shown in FIG. 2 when incorporated as the luminescent layer in a fluorescent lamp.

A2) The barium titanium pyrophosphate of alternative A1 may be replaced by

Strontium fluorophosphate activated with antimony (Sb):

Sr$_5$F(PO$_4$)$_3$:Sb which has a peak emission of about 485 nm and a half peak width of about 128 nm.

ALTERNATIVE EXAMPLES—B

In Examples 1 to 3, the blue phosphor may be replaced by:

(a) Calcium fluorophosphate activated with antimony (Sb)

Ca$_5$F(PO$_4$)$_3$: Sb having a peak emission of about 476 nm and a ½ peak width of about 136 nm; or (b) Calcium magnesium tungstate, which may be activated with lead if desired, having the formula Ca$_{(1-x)}$ Mg$_x$ WO$_4$ where $1 \leq x \leq 1$ and having: a peak emission in the range 425–480 nm and a ½ peak width in the range 105–130 nm, depending on the value of x and the extent of lead activation if any, for 0<x <1; and a peak emission of about 473 nm and a ½ peak width of about 136 nm for x= 1.

Figure 8:
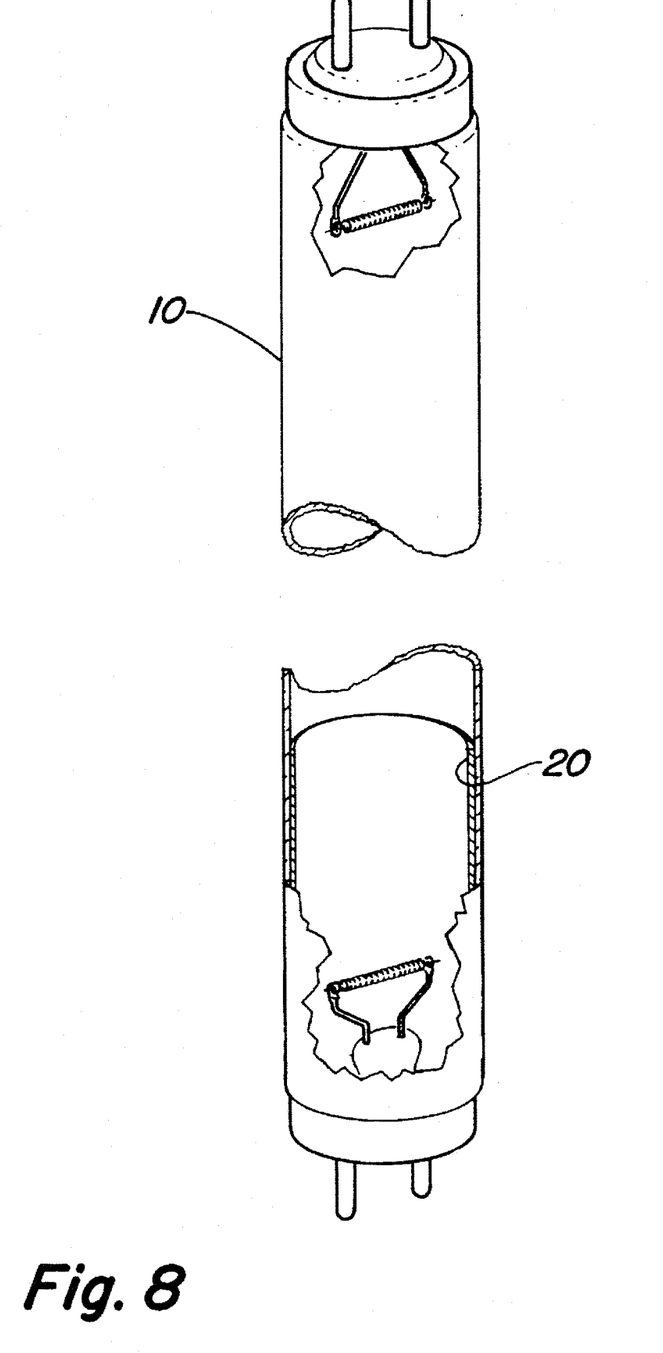
FIG. 8 is an elevational view of a fluorescent lamp utilizing the phosphor configuration of the present invention.

A selected one of these alternative blue phosphors may be blended with appropriate proportions with the red and white phosphors of Example 1 to produce a mixture which, when incorporated in a fluorescent lamp; as the luminescent layer, produces light having the color coordinates on or within the ellipse A of FIG. 2. As seen in FIG. 8, a fluorescent lamp 10 is illustrated which utilizes the phosphor coating arrangement as previously discussed in the detailed examples.

As will be readily appreciated by those skilled in the art, light having the color coordinates shown by the ellipse A of FIG. 2 represents the color appearance of the light produced by a fluorescent lamp, but will have different color rendering properties according to the phosphors selected for the mixture. Those skilled in the art will be able to select mixtures of phosphors to produce lamps in accordance with the present invention which produce good color rendition according to their subjective judgment.

We claim:

1. A fluorescent lamp for use in aquaria, the luminescent layer in said lamp comprising a mixture of:

a red emitting phosphor emitting predominantly at about 660 nm;

a blue emitting phosphor emitting predominantly in the range of 420 to 495 nm with a half peak width in the range of 100 to 170 nm;

a white emitting phosphor emitting light with a color temperature in the range of 3000k to 5500k and being effective so that when combined with said red emitting phosphor and said blue emitting phosphor, adds a green emission thereby; and, the phosphors being blended to form said mixture in such proportions that the coordinates of the lamp on the CIE chromatically diagram differ from the point x=0.344 y=0.302 in any direction by no more than 22 standard deviations of color matching (SDCM).

2. A lamp according to claim 1 wherein the red emitting phosphor being magnesium fluorogermanate activated by manganese; and, the white emitting phosphor being calcium halophosphate activated both with antimony and maganese.

3. A lamp according to claim 2 wherein the blue emitting phosphor is strontium pyrophosphate activated by tin.

4. A lamp according to claim 2 wherein the blue emitting phosphor is a compound of the formula: Ca$_{(1-x)}$Mg$_x$WO$_4$ optionally activated by lead, where $0 \leq x \leq 1$; or Ca$_5$F(PO$_4$)$_3$ activated by antimony.

5. A lamp according to claim 3 wherein the blue, red and white emitting phosphors are mixed in the ratio, by weight, 45:30:25 respectively.

6. A lamp according to claim 1 wherein said mixture is a binary mixture of the red emitting phosphor and the blue emitting phosphor, the red emitting phosphor being magnesium fluorogermanate activated by manganese and the blue emitting phosphor being barium titanium pyrophosphate or strontium fluorophosphate activated with antimony.

* * * * *